United States Patent [19]

Wickson

[11] 4,081,853

[45] Mar. 28, 1978

[54] OVERCURRENT PROTECTION SYSTEM

[75] Inventor: Arthur K. Wickson, Palos Verdes Estates, Calif.

[73] Assignee: The Garrett Corporation, Los Angeles, Calif.

[21] Appl. No.: 669,790

[22] Filed: Mar. 23, 1976

[51] Int. Cl.[2] .............................................. H02H 3/08

[52] U.S. Cl. .................................................. 361/104

[58] Field of Search ..................... 317/15, 14 B, 40 A, 317/50; 337/4, 6, 161, 162, 293; 361/104

[56] References Cited

U.S. PATENT DOCUMENTS

| | | | |
|---|---|---|---|
| 835,388 | 11/1906 | Berg | 317/40 AX |
| 2,284,114 | 5/1942 | Weichsel | 317/40 A |
| 2,672,540 | 3/1954 | Dewey | 337/293 |

FOREIGN PATENT DOCUMENTS

| | | | |
|---|---|---|---|
| 476,607 | 8/1915 | France | 361/104 |

*Primary Examiner*—Harry E. Moose, Jr.
*Attorney, Agent, or Firm*—Joel D. Talcott; Frank J. Kowalski; Albert J. Miller

[57] ABSTRACT

A plurality of fuses are connected in a general parallel configuration for protecting a circuit, the fuses being serially connected with inductances of varying magnitude such that steady state current may be divided equally among the fuses permitting the use of fuses of lower rating. During an overcurrent surge, substantially the entire current overload is applied to each fuse in turn so that the total elapsed time for opening the circuit is less than with fuses alone.

11 Claims, 4 Drawing Figures

Fig. 1.
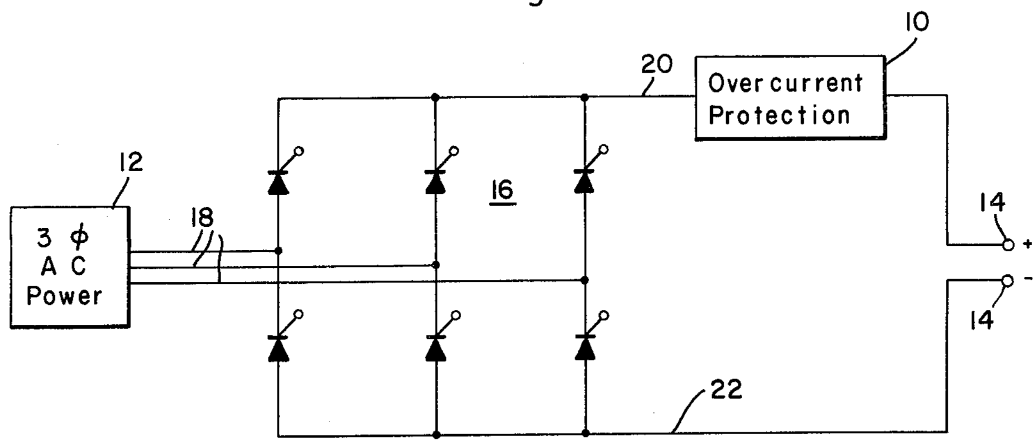
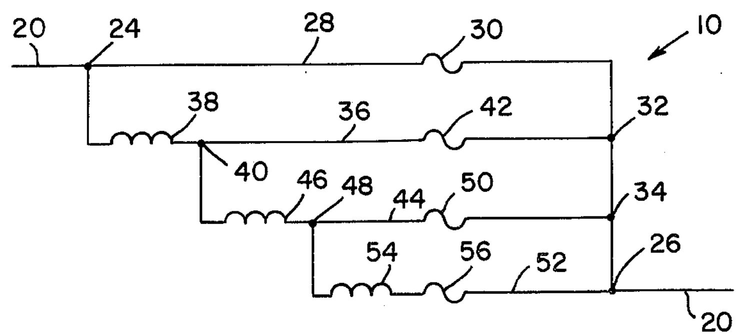
Fig. 2.
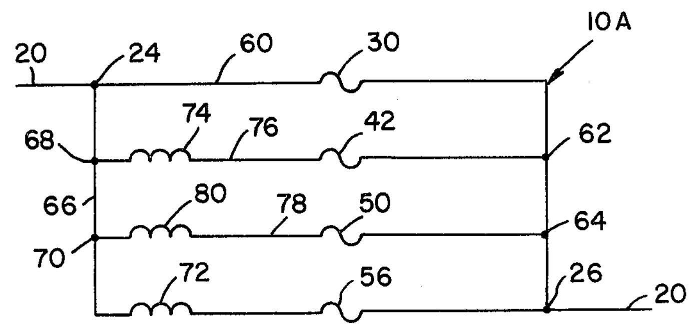
Fig. 3.
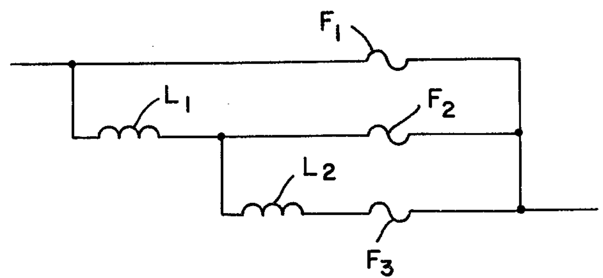
Fig. 4.

OVERCURRENT PROTECTION SYSTEM

This invention is directed to overcurrent protection systems and more particularly to a novel system for use in protecting sensitive components, such as semi-conductors, against damage caused by excessive current, the fuse system being designed to respond more quickly than fuses alone to a sudden increase in current above the continuous rated value of current for the circuit.

It is generally desirable in electrical systems to open the circuit very quickly to interrupt an overcurrent condition. In some cases, however, it is critical that circuit interruption occur in a very short time period. For example, substantial advances have been made in controlling the application of power to loads, such as electrical motors, by using thyristors either singly or in bridge or other combinations to control the application of power to the load. While the use of power thyristors is highly desirable, these semiconductor devices are destroyed by excessive current overloads of sufficient duration and are expensive to replace.

Accordingly, fuses and other protective devices are connected in series with these power thyristors to provide protection against damage due to overload currents. However, the degree of protection provided by any protective device in response to the occurrence of an overcurrent fault is dependent upon its ability to respond with sufficient speed to prevent damage to the semiconductor device.

When a given overload current is suddenly applied to a fuse, the elapsed time before the fuse link vaporizes is determined by $i^2t$ value or rating of the fuse. This rating is roughly a constant for the fuse and the vaporization time for any current level through a particular fuse can be determined by equating $i^2t$ to this rating. Any means that reduces this rating reduces the time for the link to vaporize and, accordingly, increases the protection of the components in series with the fuse. Individual fuses have been designed, and are available, with low rating values to provide the highest degree of protection, but the minimum ratings that can be attained are limited by the electrical and thermal properties of materials that are available for the construction of the fuse.

It is known in the prior art that a single fuse can be replaced by a plurality of smaller fuses connected in parallel, e.g., a 500 amp fuse may be replaced by five 100 amp fuses connected in parallel. However, the fuse rating of the combination turns out to be approximately the same as the rating of the single fuse because, although the rating of each fuse is smaller, the overcurrent fault is divided among the fuses, e.g. a 1000 amp fault current would be divided 200 amps to each fuse, so that the total time required for vaporizing all the fuses to open the circuit is roughly the same as the time required to vaporize a single 500 amp fuse.

In accordance with this invention, a single fuse is replaced by a plurality of smaller fuse connected in parallel. An inductor is connected in series with each fuse but one, the total inductance connected in series with each fuse being of differing values so that upon occurrence of an overcurrent fault, the inductors introduce a high reactance into the circuit causing substantially the entire overcurrent fault to be directed through the fuse having no series inductor associated therewith. After this fuse rapidly vaporizes, substantially the entire overcurrent is directed through the fuse having the least value of inductive reactance in series therewith. In this manner, vaporization of all fuses in the overcurrent protection system is greatly accelerated so that the time for opening the circuit is substantially reduced. Thus, by the use of inexpensive components, a sure and reliable fuse system is provided which is capable of rapidly disconnecting a load from the power source on occurrence of a sudden overcurrent fault.

The advantages of the overcurrent protection system of this invention will be more readily apparent when the following specification is read in conjunction with the appended drawings wherein:

FIG. 1 is a generally schematic view of an electrical circuit in which the overcurrent protection system of this invention may be used;

FIG. 2 is a schematic view of a preferred embodiment of overcurrent protection system of this invention;

FIG. 3 is a schematic view of an alternate embodiment of the overcurrent protection system of this invention; and FIG. 4 is a schematic view similar to FIG. 2 for illustrating the operation of the overcurrent protection system of this invention.

Referring now to the drawings, FIG. 1 illustrates in simple schematic form an example of a circuit in which an overcurrent protection system 10 in accordance with this invention might be used. It will be understood, however, that the overcurrent protection system 10 may be utilized in a wide variety of circuit applications. In this specific example, it is desired to utilize a three phase alternating current power source 12 to provide a direct current output through terminals 14 for energizing a suitable load (not shown). To accomplish this, a thyristor bridge circuit 16 is used. Conductors 18 are connected between the AC power source 12 and the thyristor bridge 16 to provide input voltage to the bridge. This three phase power output is converted in a well known manner to a direct current output fed through output conductors 20 and 22 to the DC output terminals 14.

The overcurrent protection system 10 is interposed in the conductor 20. It will be seen that only one overcurrent protection system 10 is required for protection of all six thyristors of the bridge 16 unlike prior art fuse systems which are generally only capable of protecting one or two thyristors due to insufficient sensitivity.

For optimum operation, the overcurrent protection system 10 must have a very small resistance so as to not utilize significant power when the bridge 16 is being used to power a DC load. However, in the event of a sudden overcurrent condition which could otherwise damage one or more of the thyristors in the bridge 16, the overcurrent protection system 10 must open the circuit completely in a short enough time period to prevent any thyristor damage.

The overcurrent protection system 10 of this invention fully accomplishes these requirements and the preferred embodiment is illustrated in FIG. 2. The overcurrent protection system 10 is connected to the conductor 20 at junctions 24 and 26. A conductor 28 connects the junction 24 through a fuse 30 and junctions 32 and 34 to the junction 26. The junction 24 is also connected by a conductor 36 through an inductor 38, a junction 40 and a fuse 42 to the junction 32. A conductor 44 runs from the junction 40 through an inductor 46, a junction 48 and a fuse 50 to the junction 34. The junction 48 is in turn connected to the junction 26 by a conductor 52 through an inductor 54 and a fuse 56.

In the preferred embodiment, the $i^2t$ ratings of the fuses 30, 42, 50 and 56 are generally equal and the inductors 38, 46 and 54 have substantially equal values of inductance and a very small value of DC resistance.

When the overcurrent protection system 10 of FIG. 2 is operating in a circuit under steady state conditions, the flow of current through each of the fuses 30, 42, 50 and 56 is about equal, differing only by the practically insignificant amount under steady state conditions caused by the DC resistances of the inductors 38, 46 and 54. The flow through each fuse will be about equal to one-fourth of the current output at the terminals 14.

In the event of a sudden overcurrent condition, the inductors 38, 46 and 54 have a significant effect on current flow. During this great current surge, the high inductive reactance of these inductors block current flow and thus cause substantially all of the current flow to be through the conductor 28 and fuse 30. This current value is about four times the current the fuse 30 would normally carry during such an overcurrent condition so that $i^2$ is increased by a factor of about 16 and the fuse 30 is rapidly vaporized.

After current flow through the fuse 30 has been terminated, all flow must be through the inductor 38. The inductors 46 and 54 still present high reactance paths so that little current flows through the fuses 50 and 56. Accordingly, nearly all of the current flows through the conductor 36 and fuse 42. This greatly magnified value of $i^2$ rapidly vaporizes the fuse 42.

All of the current is now directed through the inductor 46 and nearly all flows through the conductor 44 and fuse 50, little current flowing through the high reactance path presented by the inductor 54. The fuse 50 rapidly vaporizes from the application of this high current. Thereafter, the entire magnitude of the overcurrent passes through the inductor 54 flowing through the conductor 52 and fuse 56 to rapidly vaporize this fuse and fully open the circuit terminating current flow.

By the use of the overcurrent protection system 10, the steady state current flow may be divided into a number of paths so that fuses rated to carry a lower value than full load current may be used. During an overcurrent condition, action of the inductors causes the full overcurrent to be applied in turn to each fuse so that the time for vaporization of the fuses and opening the circuit is greatly reduced. It will be readily apparent that any desired number of fuses and associated inductors may be used in accordance with this invention.

An alternate embodiment of the overcurrent protection system 10A is illustrated in FIG. 3. Fuses similar in number and nature to those utilized in the overcurrent protection system 10 of FIG. 2 are preferably used in the overcurrent protection system 10A of FIG. 3 and the numbers thereof have been retained.

A conductor 60 is connected from the junction 24 through the fuse 30 and junctions 62 and 64 to the junction 26. A conductor 66 serially connects the junction 24 through junctions 68 and 70, an inductor 72 and the fuse 56 to the junction 26. An inductor 74 and the fuse 42 are serially connected between the junctions 68 and 62 by a conductor 76. A conductor 78 serially connects an inductor 80 and the fuse 50 between the junctions 70 and 64.

The structural difference between the overcurrent protection systems 10 and 10A lies in the magnitudes and connections of the inductors. While the inductors 38, 46 and 54 of the overcurrent protection system 10 of FIG. 2 have substantially equal magnitude of inductance, the inductors 74, 80 and 72 of the overcurrent protection system 10A differ in magnitude. Preferably, if the inductor 74 had an inductance L, the inductor 80 would have an inductance 2L and the inductor 72 would have an inductance 3L. It will be understood, however, that great variations in the values of these inductances are possible. Further, as in the circuit of FIG. 2, while four fuses have been illustrated in the overcurrent protection system 10A, this is merely intended as an example, it being fully understood that substantially any desired plurality of fuses and associated inductors may be utilized in accordance with this invention.

Operation of the overcurrent protection system 10A of FIG. 3 is similar to that of the overcurrent protection system 10 of FIG. 2. During steady state operation, the inductors 74, 80 and 72 exhibit insignificant reactance and resistance values so that current flow through the conductor 20 is divided into nearly aliquot portions among the fuses.

During a sudden overcurrent condition, the high current surge causes the inductors 74, 80 and 72 to exhibit high values of inductive reactance so that substantially all of the current flows via the conductor 60 through the fuse 30 which is rapidly vaporized. The current is then presented with three paths of varying reactance. As will be readily apparent to those skilled in the art, a substantial majority of the current will flow through the fuse 42 rather than through the higher impedance paths so that the value of $i^2$ is greatly increased and the time for vaporization of the fuse 42 accordingly reduced. After vaporization of the fuse 42, the greatest portion of the current flows through the inductor 80 and fuse 50 so that the fuse 50 is next vaporized. Finally, all of the current flows through the inductor 72 and fuse 56 to vaporize this fuse and completely open the circuit. By this operation, the circuit is opened in a much shorter period of time than is possible with fuses alone.

The greatly reduced time in which the overcurrent protection system 10 is capable of opening the circuit as compared to fuses alone can be illustrated with reference to FIG. 4 which is an overcurrent protection system similar to that illustrated in FIG. 2 and having fuses $F_1$, $F_2$, and $F_3$ and inductors $L_1$ and $L_2$. Comparison will be made to a single fuse which would be introduced into a circuit such as that illustrated in FIG. 1 in place of the overcurrent protection system 10 as illustrated.

If the circuit required a single fuse having a continuous rating of 300 amp., each fuse $F_1$, $F_2$, $F_3$ would have a continuous rating of 100 amp. It must be remembered that the impedance to the fault current in the external circuit is much larger than the impedance of inductors $L_1$ and $L_2$ within the overcurrent protection system.

For purposes of the comparison, it will be assumed that the sudden fault current is 3000 amp. and that this current would cause a single fuse to vaporize in T seconds. Thus, with a 10 per unit overload, the value of $i^2t$ is $9 \times 10^6$T amp$^2$ seconds.

Fuse $F_1$ (FIG. 4) has a rating of one-third that of a single fuse. The $i^2t$ rating of fuse $F_1$ is therefore about one-ninth that of the single 300 amp. fuse or about $10^6$T amp$^2$ second. When the sudden fault current of 3000 amp. passes through the overcurrent protection system 10, the first path it follows is through the fuse $F_1$. The time required for the fuse $F_1$ to vaporize is:

$$t = (10^6\text{ T})/(9 \times 10^6)\text{ seconds} = \text{T}/9\text{ seconds.}$$

As soon as the fuse $F_1$ vaporizes, the fault current transfers to the inductor $L_1$ and fuse $F_2$. Fuse $F_2$ vaporizes in about T/9 seconds. Similarly, fuse $F_3$ vaporizes in about T/9 seconds. Thus, the period required for the complete fuse system to vaporize is about T/3 seconds, or only about one/third of the time required for a single fuse to vaporize under the same conditions.

Thus can be seen that the overcurrent protection system of this invention provides significantly reduced times for opening a circuit in response to a sudden overcurrent condition so that significantly improved protection may be provided for thyristors or other circuit components without the use of expensive protective systems.

What I claim is:

1. An overcurrent protection system in a d.c. circuit containing fuses for opening a circuit in response to an overcurrent condition, said system comprising:
 first fuse means serially connected in a circuit and rated at a value less than full load current;
 a second fuse means connected in parallel with said first fuse means and rated at a value less than full load current; and
 impedance means connected serially with said second fuse means and in parallel with said first fuse means for permitting flow through each of said first and second fuse means during steady state conditions of a substantially aliquot portion of circuit current, impeding current flow through said second fuse means during an overcurrent until vaporization of said first fuse means, and permitting thereafter substantially full overcurrent flow through said second fuse means.

2. An overcurrent protection system as in claim 1 including:
 third fuse means connected in parallel with said second fuse means, and
 additional impedance connected serially with said third fuse means in parallel with said second fuse means for permitting flow during steady state conditions of a substantially aliquot portion of circuit current, impeding current flow through said third fuse means during an overcurrent until vaporization of said first and second fuse means and permitting thereafter substantially the full magnitude overcurrent flow through said third fuse means.

3. An overcurrent protection system for a circuit for applying direct current from a source to a load, said system comprising:
 a plurality of fuse means forming parallel paths for simultaneously carrying substantially an aliquot portion of steady state current; and
 impedance means selectively serially connected with a plurality of said fuse means for impeding current flow upon occurrence of overcurrent and directing substantially all of the overcurrent to each of said plurality of fuses seriatim.

4. An overcurrent protection system as in claim 3 wherein one of said fuse means has no impedance means connected in series therewith.

5. An overcurrent protection system as in claim 3 wherein said fuse means and impedance means comprise:
 first fuse means;
 second fuse means; and
 first inductor means;
 said second fuse means and first inductor means being serially connected across said first fuse means.

6. An overcurrent protection system as in claim 5 wherein said fuse means and impedance means include:
 third fuse means; and
 second indicator means;
 said third fuse means and second indicator means being serially connected across said second fuse means.

7. An overcurrent protection system as in claim 5 wherein said first and second inductor means have substantially equal reactance.

8. An overcurrent protection system as in claim 5 wherein said fuse means and impedance means include:
 third fuse means; and
 second inductor means;
 said third fuse means and second inductor means being serially connected across said first fuse means.

9. An overcurrent protection system as in claim 8 wherein said first and second inductor means are of differing reactance.

10. An overcurrent protection system as in claim 9 wherein the reactance of said second inductor means is generally double the reactance of said first inductor means.

11. A method of accelerating the response time to an overcurrent condition in excess of a predetermined value of load current in a d.c. system of a pair of fuses having substantially equal overcurrent response characteristics, said method comprising the steps of:
 connecting fuses each having a current limiting value less than the predetermined load current value;
 impeding flow of current through one of said fuses an occurrence of an overcurrent condition for rapidly vaporizing the other of said fuses; and
 permitting full flow of current through said one fuse after vaporization of said other fuse for rapidly vaporizing said one fuse.

* * * * *